(12) United States Patent
Takishima et al.

(10) Patent No.: US 6,324,141 B2
(45) Date of Patent: Nov. 27, 2001

(54) OPTICAL SYSTEM FOR OPTICAL DISC DRIVE

(75) Inventors: Suguru Takishima, Tokyo; Hiroshi Nishikawa, Saitama-ken, both of (JP); Amit Jain, Sunnyvale, CA (US)

(73) Assignees: Asahi Kogaku Kogyo Kabushiki Kaisha, Tokyo (JP); Terastor Corporation, Milpitas, CA (US)

( * ) Notice: Subject to any disclaimer, the term of this patent is extended or adjusted under 35 U.S.C. 154(b) by 0 days.

(21) Appl. No.: 09/785,165

(22) Filed: Feb. 20, 2001

Related U.S. Application Data

(63) Continuation of application No. 09/177,567, filed on Oct. 23, 1998.

(30) Foreign Application Priority Data

Oct. 24, 1997 (JP) .................................................. 9-309863
Oct. 27, 1997 (JP) .................................................. 9-311522
Oct. 27, 1997 (JP) .................................................. 9-311523

(51) Int. Cl.$^7$ ........................................................ G11B 3/90
(52) U.S. Cl. ................................. 369/53.25; 369/112.24; 369/112.29; 369/119
(58) Field of Search ........................ 369/44.11, 44.14, 369/44.17, 53.11, 53.25, 53.28, 53.38, 112.01, 112.23, 112.25, 112.24, 112.29, 119

(56) References Cited

U.S. PATENT DOCUMENTS

| 2,750,461 | 6/1956 | Bunch . |
| 3,244,917 | 4/1966 | Gute . |
| 3,354,833 | 11/1967 | Laing . |

FOREIGN PATENT DOCUMENTS

| 0084727 | 8/1983 | (EP) . |
| 0084728 | 8/1983 | (EP) . |
| 0448362 | 9/1991 | (EP) . |
| 0790512 | 8/1997 | (EP) . |
| 0907163 | 4/1999 | (EP) . |
| 378922 | 8/1932 | (GB) . |
| 1314002 | 4/1973 | (GB) . |
| 1457995 | 12/1976 | (GB) . |
| 2000604 | 1/1979 | (GB) . |
| 2086092 | 5/1982 | (GB) . |
| 2193341 | 2/1988 | (GB) . |
| 62262017 | 11/1987 | (JP) . |
| 64-2015 | 1/1989 | (JP) . |
| 5128561 | 5/1993 | (JP) . |
| 8315404 | 11/1996 | (JP) . |
| 90/08363 | 7/1990 | (WO) . |
| 98/06095 | 2/1998 | (WO) . |
| 98/49675 | 11/1998 | (WO) . |
| 98/49684 | 11/1998 | (WO) . |

OTHER PUBLICATIONS

Patent Abstracts of Japan, vol. 012, No. 140 (P–696), dated Apr. 18, 1988.
Patent Abstracts of Japan, vol. 017, No. 505 (P–1611), dated Sep. 10, 1993.

(List continued on next page.)

*Primary Examiner*—Paul W. Huber
(74) *Attorney, Agent, or Firm*—Greenblum & Bernstein, P.L.C.

(57) ABSTRACT

There is provided a head of an optical data recording/reproducing device. The head is provided with a laser source, a deflector, a relay optical system and an objective lens system. The laser beam emitted by the laser source is incident on the objective lens system via the deflector and the relay optical system. The head is further provided with a rotation angle detecting system which includes a beam splitter provided between first and second relay lenses of the relay lens system, and a detector. The beam splitter divides the incident beam into a first beam directed to the second relay lens and a second beam directed to the detector. The detector has two light receiving areas, and a controller determines an amount of rotation of the deflector based on the amounts of light received by the two light receiving areas.

2 Claims, 8 Drawing Sheets

U.S. PATENT DOCUMENTS

| | | |
|---|---|---|
| 4,088,914 | 5/1978 | Aoki . |
| 4,126,796 | 11/1978 | Ito . |
| 4,206,379 | 6/1980 | Owda . |
| 4,285,566 | 8/1981 | Yamamoto . |
| 4,297,713 | 10/1981 | Ichikawa et al. . |
| 4,351,596 | 9/1982 | Ohniwa et al. . |
| 4,466,088 | 8/1984 | Trethewey . |
| 4,891,998 | 1/1990 | Tourville . |
| 4,959,824 | 9/1990 | Ueda . |
| 4,968,876 | 11/1990 | Iima . |
| 5,125,750 | 6/1992 | Corle et al. . |
| 5,126,899 | 6/1992 | Kanazawa . |
| 5,136,559 | 8/1992 | Nakayama . |
| 5,151,890 | 9/1992 | Yonekubo . |
| 5,220,550 | 6/1993 | Nakayama . |
| 5,254,893 | 10/1993 | Ide . |
| 5,365,504 | 11/1994 | Noguchi . |
| 5,420,848 | 5/1995 | Date et al. . |
| 5,422,872 | 6/1995 | Hsu et al. . |
| 5,444,683 | 8/1995 | Ishikawa . |
| 5,461,498 | 10/1995 | Iwao . |
| 5,517,474 | 5/1996 | Takamine . |
| 5,532,480 | 7/1996 | Scofield . |
| 5,564,585 | 10/1996 | Saitoh . |
| 5,596,446 | 1/1997 | Plesko . |
| 5,608,280 | 3/1997 | Tamemoto et al. . |
| 5,610,752 | 3/1997 | Hayakawa . |
| 5,625,244 | 4/1997 | Bradfield . |
| 5,684,762 | 11/1997 | Kubo . |
| 5,705,868 | 1/1998 | Cox . |
| 5,719,834 | 2/1998 | Futagawa et al. . |
| 5,764,613 | 6/1998 | Yamamoto . |
| 5,768,241 | 6/1998 | Kanazawa et al. . |
| 5,844,676 | 12/1998 | Southam et al. . |
| 5,886,438 | 3/1999 | Kawanishi . |
| 5,920,140 | 7/1999 | Nakagishi et al. . |

OTHER PUBLICATIONS

An article entitled "Optical Magnetic Disk Device Of U.S. TeraStor Succeeds Tracking Control—Track Pitch Of 0.34 μm Realized Using Two–Stage Servo", which appeared at pp. 13 and 14 of the Japanese language magazine *Nikkei Electronics*, Sep. 22, 1997 (No. 699).

A screen capture of a page from TeraStor's website (dated Mar. 19, 1997) entitled "Architecture of TeraStor's Near–Field Technology".

An article by B.D. Terris et al., entitled "Near–Field Optical Data Storage", Applied Physics Letters, vol. 68, pp. 141–143, Jan. 8, 1996.

Article entitled "Trillions Of Bytes", by Eric Nee, which appeared in the Mar. 24, 1997 issue of Forbes magazine.

Article entitled "In 1998, 10 GB Per Inch2 Is Realized Using New Optical Recording Technology", that appeared at pp. 148–151 of the Sep., 1997 Japanese language edition of Nikkei Byte magazine.

OPTICAL SYSTEM FOR OPTICAL DISC DRIVE

CROSS-REFERENCE TO RELATED APPLICATIONS

This application is a continuation of U.S. patent application Ser. No. 09/177,567, filed Oct. 23, 1998,pending, the contents of which are expressly incorporated by reference herein in its entirety.

BACKGROUND OF THE INVENTION

The present invention relates to an optical system to be employed in an optical disc drive to read/write data from/to an optical disc.

Recently, technology in the field of magneto-optical disc drives has been greatly improved such that a data recording density on a magneto-optical disc has reached in excess of 10 Gbits/inch$^2$.

In such an optical disc drive, an objective optical system is mounted on an arm which is movable in a transverse direction of tracks formed on an optical disc for rough tracking. Firstly, the rough tracking is performed to locate the optical head in the vicinity of the track. Then, the incident angle of a beam which is incident on the objective optical system is changed (i.e., a fine tracking is performed), with use of a deflector such as a galvano mirror or the like. During the fine tracking operation, the beam spot is accurately located on one of the tracks, whose pitch is, for example, 0.34μm.

In order to control the tracking operation, it is necessary to detect the amount of rotation of the galvano mirror. Specifically, in the optical disc drive described above, if the galvano mirror is rotated to a position out of a certain rotational range to adjust the position of the beam spot, optical performance of the disc drive may be significantly lowered. Thus, the rotation angle of the deflection mirror should be monitored and controlled so as not to exceed a predetermined rotational range.

SUMMARY OF THE INVENTION

It is therefore an object of the invention to provide an improved optical system, which is applicable to an optical disc drive having a rotatable deflection system, and enables to perform the tracking operation accurately.

For the above object, according to the present invention, there is provided a head of an optical data recording/reproducing device, which is provided with: a laser source that emits a laser beam; a deflector on which the laser beam emitted by the laser source is incident; a relay optical system including a first relay lens and a second relay lens; an objective lens system, the laser beam emitted by the laser source being incident on the objective lens system through the deflector and the relay optical system; a beam splitter provided between the first relay lens and the second relay lens, the beam splitter dividing a beam passed through the first relay lens into a first beam directed to the second relay lens and a second beam directed away from the optical axis of the relay lens system; a detector having a light receiving surface on which the second beam is incident; and a controller which determines a direction and amount of rotation of the deflector based in accordance with the position of the light receiving surface on which a beam is incident.

Optionally, the relay lens system may be configured such that a position in the vicinity of a rotation axis of the deflector and a front principal plane of the objective optical system have a conjugate relationship. Further, it is preferable that the laser source emits a parallel beam.

Further optionally, it is preferable that the first relay lens and the second relay lens area arranged such that focal points thereof substantially coincide with each other.

In one case, the beam splitter may be located between the first relay lens and a focal point of the second relay lens.

Specifically, the light receiving surface of the detector may have two light receiving areas arranged in a direction where a beam spot moves when the deflector rotates, and the controller may determine the direction and amount of rotation of the deflector by comparing the amounts of light received by the two light receiving areas.

Alternatively, the beam splitter may be located between the focal point of the first relay lens and the second relay lens.

Specifically, the light receiving surface may have two light receiving areas arranged in a direction where a beam spot moves when the deflector rotates, and the controller may determine the direction and amount of rotation of the deflector by comparing the amounts of light received by the two light receiving areas.

Optionally, the beam splitter and the second relay lens may be formed integrally.

Further alternatively, the beam splitter may be located substantially at the focal point of the first relay lens.

Specifically, the detector may include a PSD (Position Sensitive Device) for detecting a position of the light receiving surface on which the beam spot is formed, the light receiving surface extending in a direction where a beam spot moves when the deflector rotates, and wherein the controller determines the direction and amount of rotation of the deflector based on the position of the beam spot on the light receiving surface.

DESCRIPTION OF THE ACCOMPANYING DRAWINGS

DESCRIPTION OF THE EMBODIMENTS

Hereinafter, the invention will be described with reference to the accompanying drawings.

Firstly, an optical disc drive to which the each of the embodiments is applicable will be described.

Figure 1:
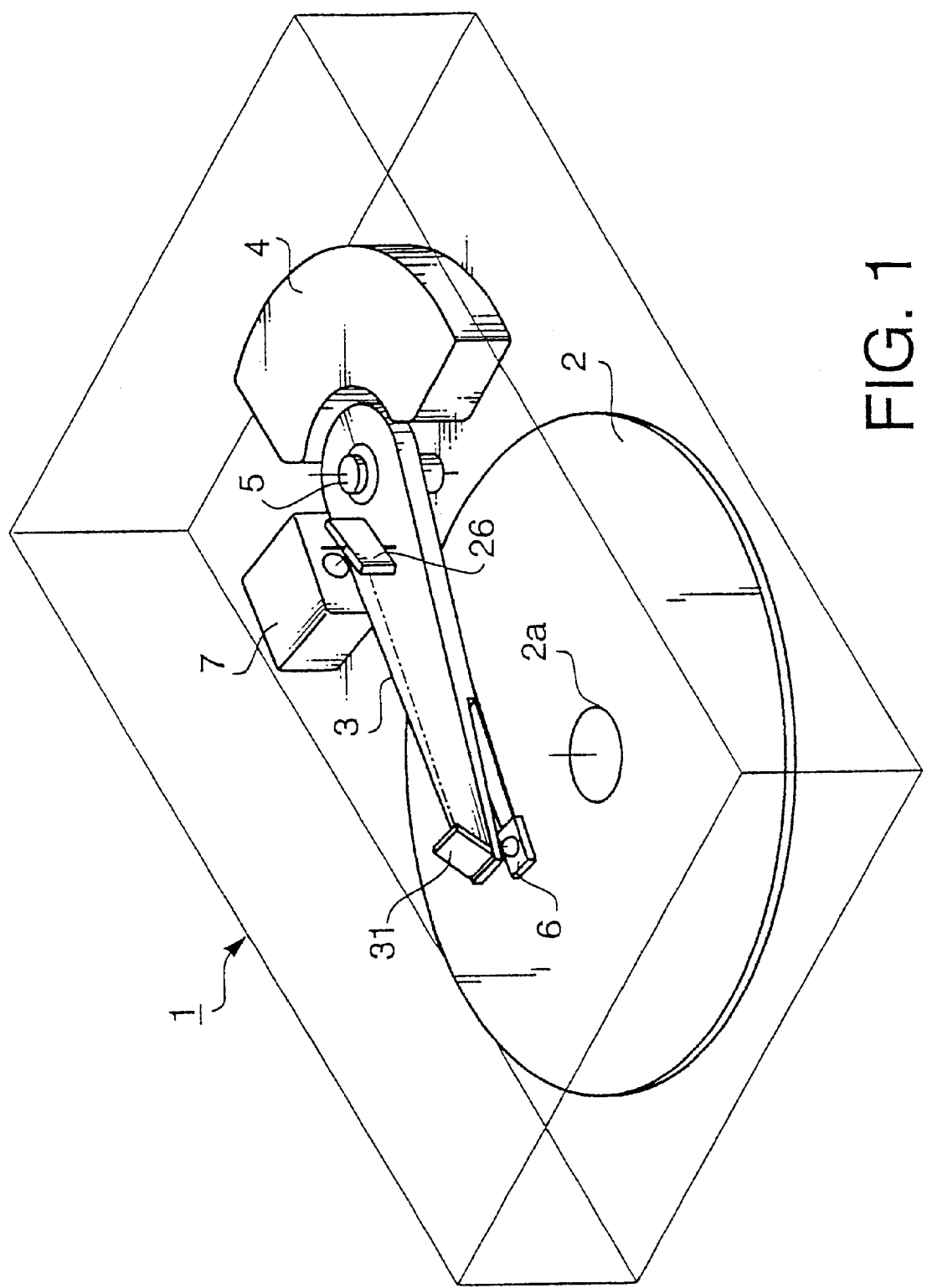
FIG. 1 is a perspective view of an optical disc drive to which first and the second embodiments of the present invention is embodied.

FIG. 1 is a perspective view of the optical disc drive (hereinafter, referred to as the disc drive) 1. The disc drive 1 is arranged to write and read data on an optical disc 2 by means of a so-called Near Field Recording (NFR) technology.

In the disc drive 1, the optical disc 2 is mounted to a rotating shaft 2a of a not-shown spindle motor. The disc drive I includes a rotary arm 3 extending in parallel to a surface of the optical disc 2, and is rotatably supported by a shaft 5. A floating head 6 that carries optical elements (described later) is provided to a tip of the rotary arm 3. When the rotary arm 3 is rotated, the floating head 6 moves across tracks formed on the optical disc 2. The rotary arm 3 is further provided with a light source module 7 in the vicinity of the shaft 5.

Figure 2:
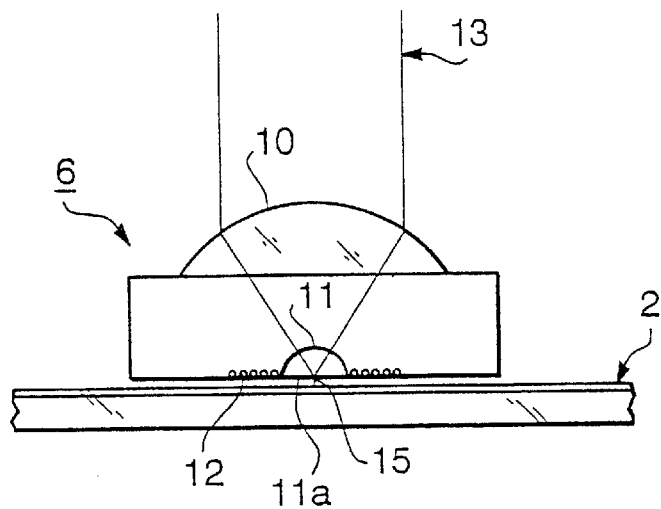
FIG. 2 is an enlarged view of a floating head of the optical disc drive of FIG. 1.
Figure 3:
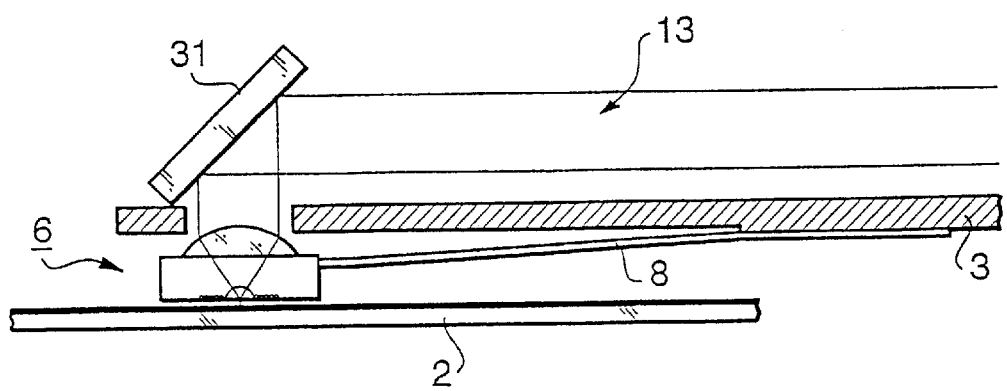
FIG. 3 is an enlarged view of the tip of the rotary arm of the optical disc drive of FIG. 1.

FIG. 2 is an enlarged view of the floating head 6. FIG. 3 is an enlarged view of the tip of the rotary arm 3. As shown in FIG. 3, the floating bead 6 is mounted to the rotary arm 3 via a flexure beam 8. One end of the flexure beam 8 is fixed to the bottom of the rotary arm 3, while the floating head 6 is fixed to the other end of the flexure beam 8. When the optical disc 2 rotates, the floating head 6 is lifted upward by air flow generated between the spinning optical disc 2 and the floating head 6. When the floating head 6 is lifted upward, the flexure beam 8 is elastically deformed, which urges the floating head 6 downward. With this construction, the floating amount of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflecting mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens and the plane surface thereof is faced with the optical disc 2. Further, the focal point of the objective lens 10 is positioned on the plane surface of the solid immersion lens 11. That is, the laser beam 13 is converged on the plane surface 11a of the solid immersion lens 11. Since the clearance of the optical disc and the plane surface 11a of the solid immersion lens 11 is less than 1 μm, the converged laser beam is converted to a so-called evanescent beam and reaches the optical disc 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68, 141–143 (1996), and U.S. Pat. No. 5,125,750 issued on Jun. 30, 1992, teachings of which are incorporated by reference in their entireties.

In order to apply magnetic field on the surface of the optical disc 2, a coil 12 is provided around the solid immersion lens 11. A current flow in the coil 12 generates a magnetic field in which the optical disc 2 is positioned. Data writing is performed by the evanescent beam from 10 the solid immersion lens 11 and the magnetic field generated by the coil 12.

Figure 4:
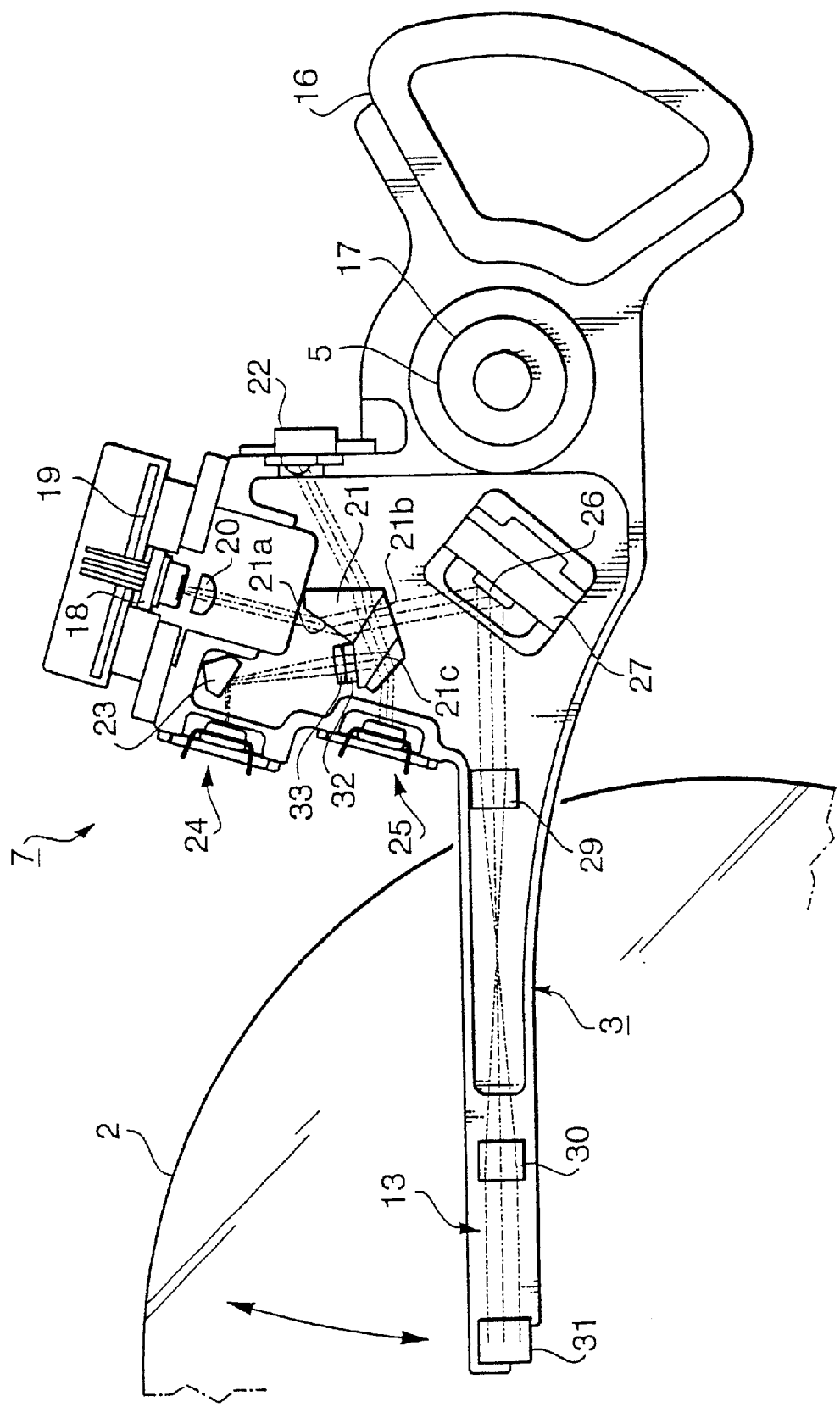
FIG. 4 is a top view of the rotary arm of the optical disc drive of FIG. 1.
Figure 5:
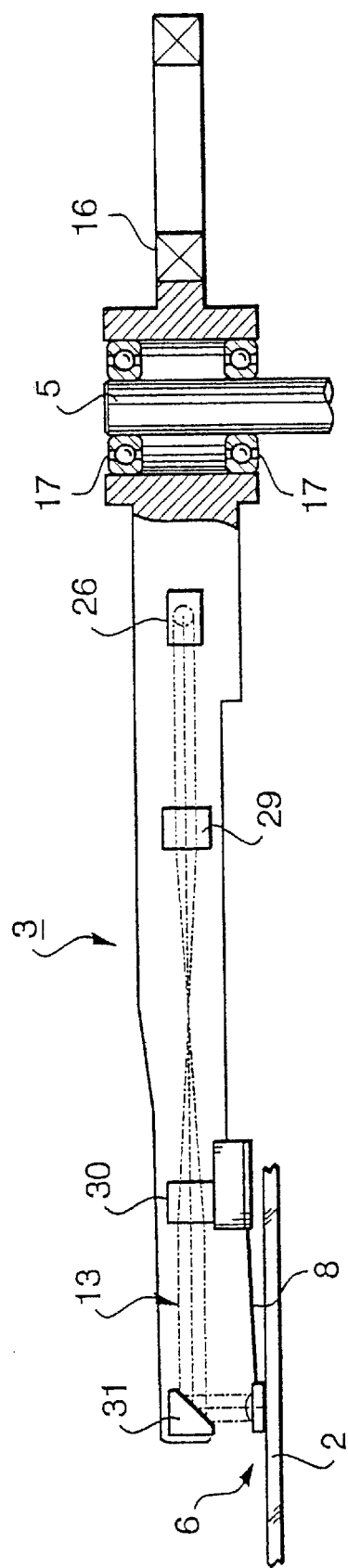
FIG. 5 is a longitudinal sectional view of the rotary arm of the optical disc drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disc 2. For this purpose, a galvano mirror 26 is provided in a light path between the light source module 7 and the objective lens 10. In particular, the galvano mirror 26 is located so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disc 2. By rotating the galvano mirror 26, the incident angle of the laser beam 13 incident on the objective lens 10 is changed, so that the light spot on the optical disc 2 is moved. It should be noted that the rotation angle of the galvano mirror 26 is detected with use of a rotation angle detecting system, which is not shown in FIG. 4 and will be described as embodiments of the present invention later.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the objective lens 10 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely incident on the objective lens 10 irrespective of the rotation of the galvano mirror 26.

The laser beam 13 that has returned from the surface of the optical disc 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disc 2. In particular, the data signal from the tracking detection sensor 25 and data detection sensor 24 are generated by a not-shown amplifier circuit and sent to a not-shown control circuit.

Hereinafter, the rotation angle detecting systems according to first to three embodiments of the present invention will be described. In each embodiment, a beam splitter is provided to divide the beam directed from the galvano mirror 26 to the objective lens 10. Specifically, the beam splitter splits the beam from the galvano mirror 26 into a first beam directed to the objective lens 10 and a second beam directed to a detector which is used for detecting the rotation angle of the galvano mirror 26.

[First Embodiment]

Figure 6:
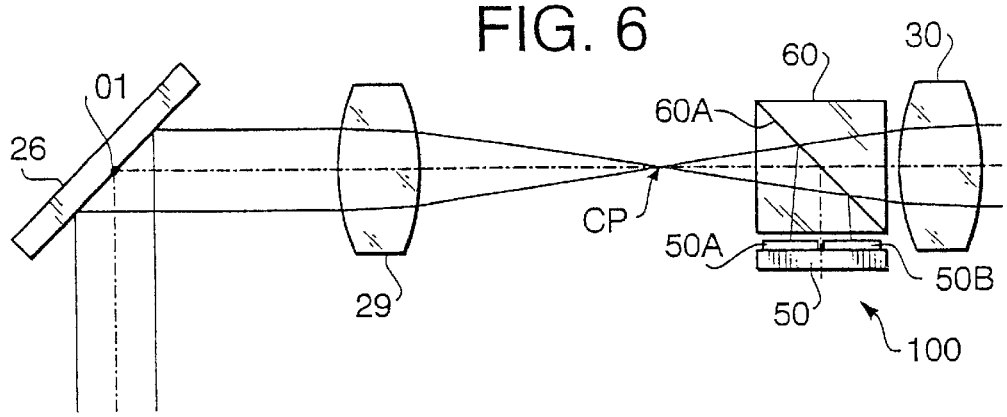
FIG. 6 shows a structure of a rotation angle detecting system according to a first embodiment of the invention.
Figure 7:
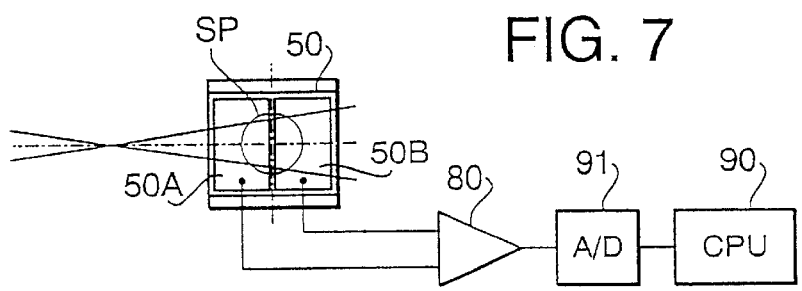
FIG. 7 shows a positional relationship between a beam spot and light receiving areas of a detector.

FIG. 6 shows a rotation angle detecting system 100 according to a first embodiment of the invention, which is inserted within the optical path from the galvano mirror 26 to the relay lens 30. In FIG. 6, the rotating axis O1 of the galvano mirror 26 is perpendicular to a surface of the drawing. FIG. 7 shows a plan view of the detector 50. In FIG. 7, a beam spot SP formed on the detector 50 is indicated by broken lines.

As shown in FIGS. 6 and 7, the rotation angle detecting system 100 includes a beam splitter 60 and a detector 50. The beam splitter 60 is arranged between the first relay lens 29 and the second relay lens 30. In FIG. 6, the beam splitter 60 is provided between a converging point CP of the beam passed through the first relay lens 29. It may be possible that the beam splitter 60 is located between the converging point CP and the first relay lens 29. The beam reflected by the galvano mirror 26 is incident on a half-mirror surface 60A which is formed inside the beam splitter 60, and divided into a first beam which passes through the half-mirror surface 60A, and a second beam which is reflected by the half-mirror surface 60A. The half-mirror surface 60A is inclined at 45 degrees with respect to the optical axis of the relay lens system. The first beam passes through the second relay lens 30, is reflected by the reflection mirror 31 and incident on the objective lens 10 as described above.

The second beam is incident on the detector 50. The detector 50 has at least two light receiving areas 50A and 50B arranged in a direction in which the spot SP moves as the galvano mirror 26 rotates. As described above, the beam incident on the galvano mirror 26 has a circular cross section, and accordingly, the spot SP formed on the light receiving areas 50A and 50B is substantially circular. As shown in FIG. 7, output signals of the light receiving areas 50A and 50B are applied to a differential amplifier 80, and the output of the differential amplifier 80 is input into a CPU (Central Processing Unit) 90 via an A/D (analog-to-digital) converter 91. The difference between the output signals of the light receiving areas 50A and 50B represents the direction and amount of rotation of the galvano mirror 26. The CPU 90 detects the rotating direction and calculates the rotation angle of the galvano mirror 26 in accordance with the difference between the output signals of the light receiving areas 50A and 50B.

The position of the detector 50 and the light receiving areas 50A and 50B are determined such that each of the light receiving areas 50A and 50B receives the same amount of light when the galvano mirror 26 is located at its neutral position (i.e., when the incident angle of the beam which is incident on the galvano mirror is substantially 45 degrees). Thus, by detecting the difference of light amounts received by the light receiving areas 50A and 50B, the amount of rotation (i.e., the rotation angle) by which the galvano mirror 26 rotates can be detected. FIGS. 6 and 7 show a situation when the galvano mirror 26 is located at the neutral position.

Figure 8:
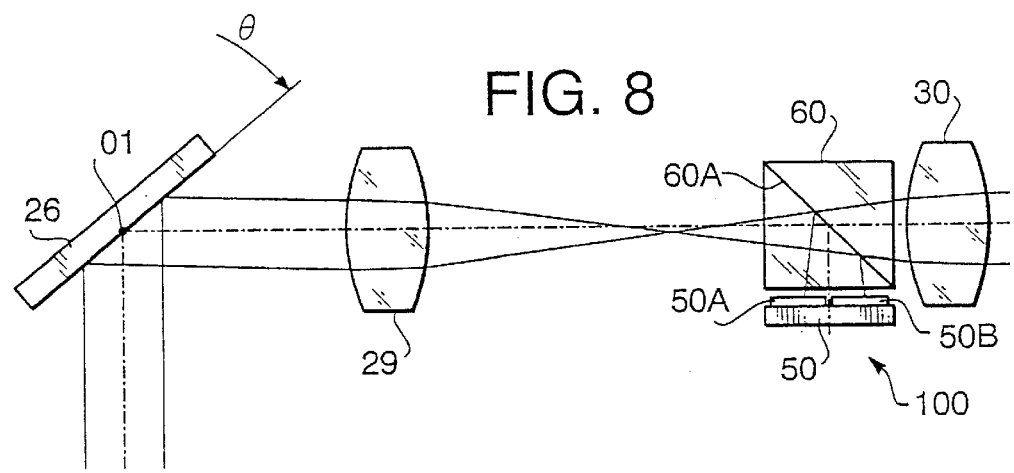
FIG. 8 shows how the beam proceeds when the deflecting mirror is rotated.
Figure 9:
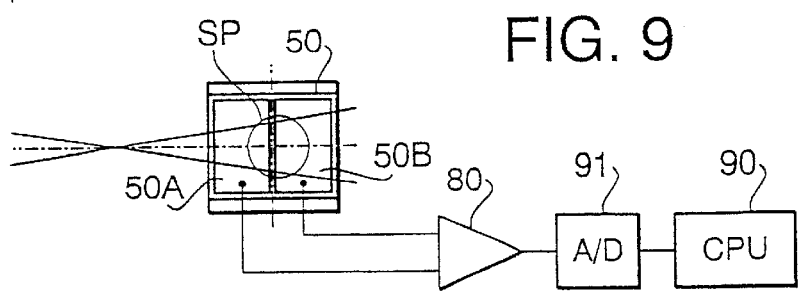
FIG. 9 shows a positional relationship between the beam spot and the light receiving areas when the galvano mirror is rotated.

FIGS. 8 and 9 show a situation where the galvano mirror 26 is located by a certain amount. When the galvano mirror 26 is rotated, for example in clockwise direction, the beam spot SP on the light receiving areas 50A and 50B also moves as shown in FIG. 9. Therefore, the light receiving areas 50A and 50B receive different amounts of light. By comparing the amounts of light respectively received by the light receiving areas SOA and SOB, the amount of rotation of the galvano mirror 26 can be detected. It should be noted that since the position in the vicinity of the rotation axis O1 of the galvano mirror 26 and the front principal plane of the objective lens 10 (i.e., the entrance pupil) have substantially conjugate relationship, even if the galvano mirror 26 rotates, the beam is incident on substantially the same position but at different incident angles, of the objective lens 10.

Figure 18:
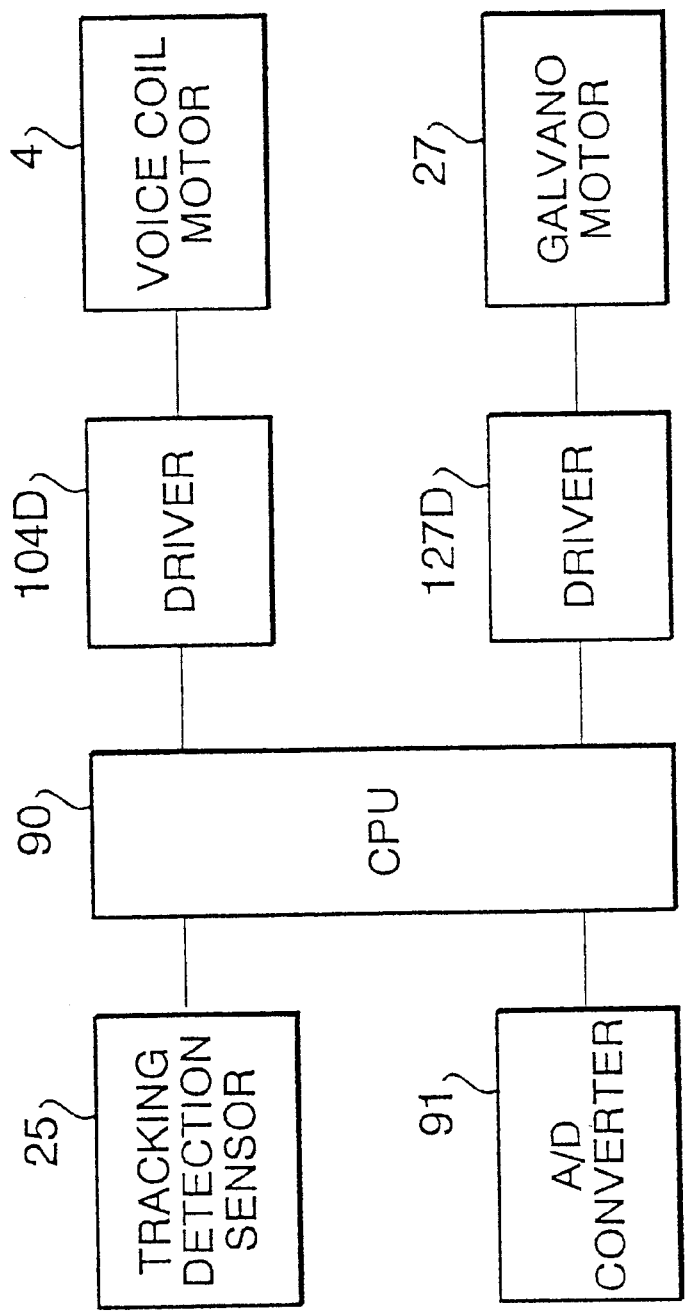
FIG. 18 is a block diagram illustrating a control system for executing a tracking operation.

FIG. 18 is a block diagram illustrating a control system for executing the tracking operation. As described above, the output signal of the A/D converter is transmitted to the CPU 90, which detects the rotational position of the galvano mirror 26. Based on the detected rotational position of the galvano mirror 26 and the tracking error signal output by the tracking detection sensor 25, the CPU 90 calculates a resultant rotational position, which represents a rotational position of the galvano mirror 26 after it is rotated to adjust the position of the beam spot.

If the resultant rotational position is within a predetermined allowable rotation range, the CPU 90 controls a driver 127D of the galvano motor 27 to rotate the galvano mirror 26 such that the beam spot is directed on a desired one of the tracks of the optical disc 2 accurately. If the resultant rotational position of the galvano mirror 26 is out of the predetermined allowable rotation range, the CPU 90 converts the resultant rotational position into an amount of movement of the rotary arm 3, and controls a driver 104D of the voice coil motor 4 to rotate the rotary arm 3 instead of rotating the galvano mirror 26. As a result of movement of the rotary arm 3, the beam spot is located on the desired track, and further the galvano mirror 26 is located at the neutral position, i.e., a center of the allowable rotational range. Thereafter, if necessary, a further fine tracking operation for locating the beam spot accurately on the desired track may be executed.

As described above, according to the first embodiment, the rotation direction and amount of the galvano mirror 26 can be detected accurately, and therefore an accurate tracking operation can be performed without lowering the optical performance.

[Second Embodiment]

Figure 10:
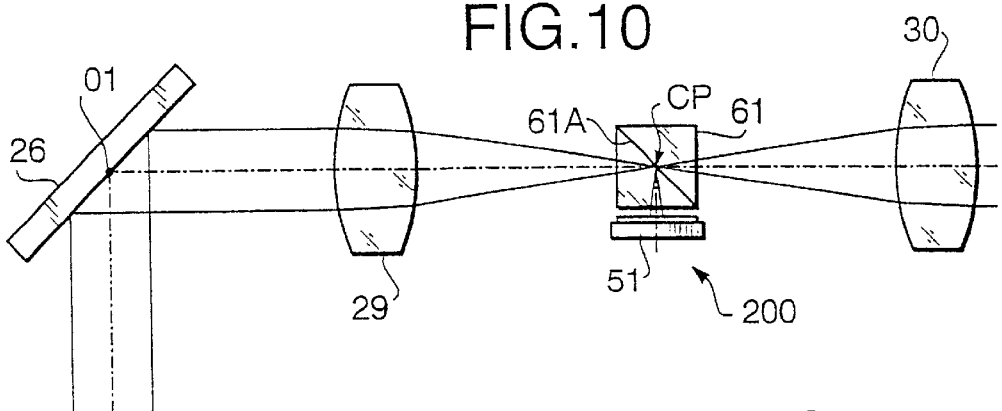
FIG. 10 shows a structure of the rotation angle detecting system according to a second embodiment of the invention.
Figure 11:
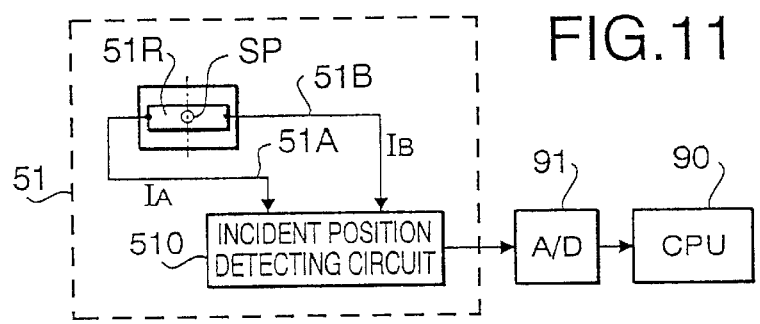
FIG. 11 shows a positional relationship between a beam spot and light receiving areas of a detector.

FIG. 10 shows a rotation angle detecting system 200 according to a second embodiment of the invention, which is inserted within the optical path from the galvano mirror 26 to the relay lens 30. In FIG. 10, the rotating axis O1 of the galvano mirror 26 is perpendicular to a surface of the drawing. FIG. 11 shows a plan view of the detector 51. In FIG. 11, a beam spot SP formed on the detector 51 is indicated by broken lines.

As shown in FIGS. 10 and 11, the rotation angle detecting system 200 includes a beam splitter 61 and a detector 51. The beam splitter 61 is arranged between the first relay lens 29 and the second relay lens 30. Specifically, in the second embodiment, the beam splitter 60 is provided substantially at a converging point CP of the beam passed through the first relay lens 29. The beam reflected by the galvano mirror 26 is incident on a half-mirror surface 61A which is formed inside the beam splitter 61, and divided into a first beam which passes through the half-mirror surface 61A, and a second beam which is reflected by the half-mirror surface 61 A. The half-mirror surface 61 A is inclined at 45 degrees with respect to the optical axis of the relay lens system. The first beam passes through the second relay lens 30, is reflected by the reflection mirror 31 and incident on the objective lens 10.

The second beam is incident on the detector 51. The detector 51 is a so-called PSD (Position Sensitive Device) which has, as shown in FIG. 11, a light receiving area SP extending in a direction in which the beam spot SP moves as the galvano mirror 26 rotates. At the longitudinal ends of the light receiving area 51R, a pair of electrodes 51A and 51B are connected such. Electrical currents IA and IB flow through the electrodes 51A and 51B, the quantity of the currents IA and IB depend on the position of the light receiving area 5 1R on which the beam is incident. The electrical currents IA and IB are input to an incident position detecting circuit 510 through the electrodes 51A and 51B. The incident position detecting circuit 510 detects the incident position on the light receiving area 51R where the beam is incident in accordance with the electrical currents IA and IB, and generates a signal representative of the incident position.

The output signal of the incident position detecting circuit 510 is input to the CPU 90 via the A/D converter 91. The CPU 90 includes a non-volatile memory (not shown) storing data representing a relationship between the incident position on the light receiving area 51R and the rotation direction and amount of the galvano mirror 26. Thus, the CPU 26 is capable of obtaining the direction and amount of rotation of the galvano mirror 26 in accordance with the output of the PSD 51.

FIGS. 10 and 11 show a situation when the galvano mirror 26 is located at the neutral position.

Figure 12:
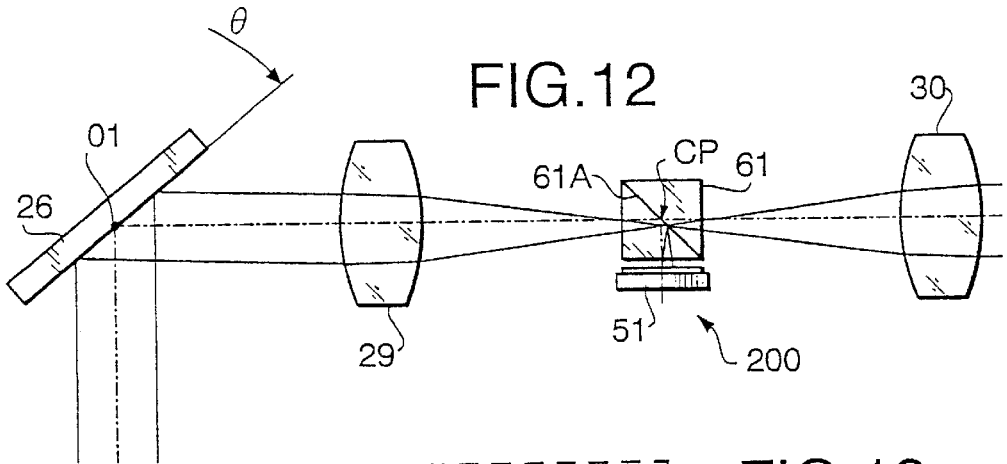
FIG. 12 shows how the beam proceeds when the galvano mirror is rotated.
Figure 13:
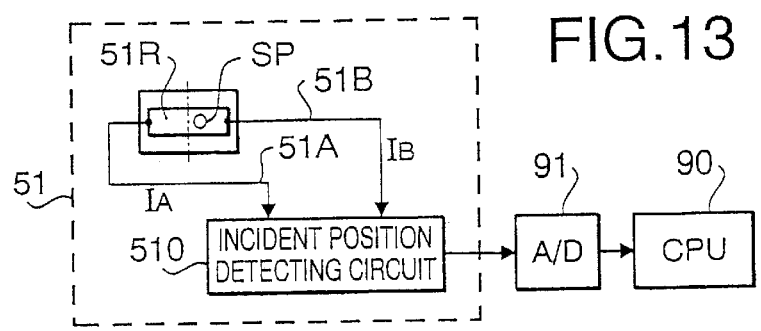
FIG. 13 shows a positional relationship between the beam spot and the light receiving areas when the galvano mirror is rotated.

FIGS. 12 and 13 show a situation where the galvano mirror 26 is rotated by a certain amount. When the galvano mirror 26 is rotated, the beam spot SP on the light receiving area 51R moves as shown in FIG. 13. In this case the current IA is greater than the current IB. The incident position detecting device 510 outputs the signal representing the position of the beam spot SP on the light receiving area 51R in accordance with the currents IA and IB. Then, the CPU 90 detects the direction and the amount of rotation of the galvano mirror 26.

As described above, according to the second embodiment, the rotation direction and amount of the galvano mirror 26 can be detected accurately, and therefore an accurate tracking operation can be performed. It should be noted that the control system shown in FIG. 14 can be applicable when the second embodiment is employed in the optical disc drive I instead of the first embodiment.

It should further be noted that, in the second embodiment, since the beam splitter 61 is provided substantially at the portion where the beam passed through the first relay lens 29 converges, the beam reflected by the reflection surface 61A of the beam splitter 61 forms a relatively small spot on the detector 51. Therefore, the light receiving area 51R in the second embodiment can be made relatively small.

[Third Embodiment]

Figure 14:
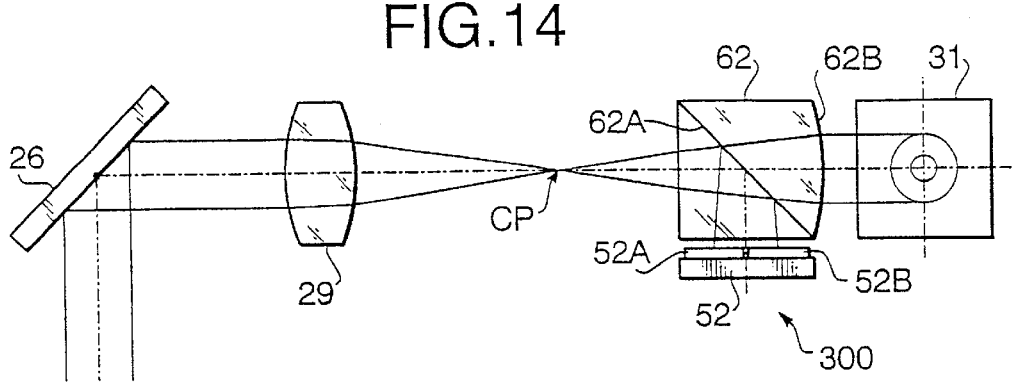
FIG. 14 shows a structure of the rotation angle detecting system according to a third embodiment of the invention.

FIG. 14 shows a rotation angle detecting system 300 according to a third embodiment of the invention. In the third embodiment, a light collecting prism 62 is employed instead of the relay lens 30 and the beam splitters 60 and 61 used in the first and second embodiments. The light collecting prism 62 is formed as a composite element of a beam splitter and the relay lens 30. That is, the light collecting prism 62 has a function of a beam splitter as well as a function of the relay lens 30 used in the first and second embodiments.

Figure 15:
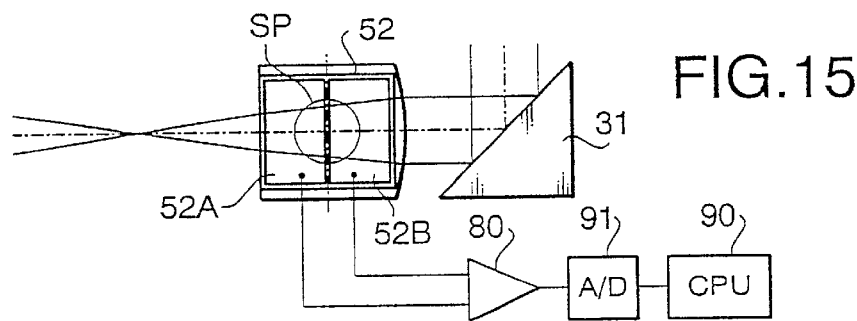
FIG. 15 shows a positional relationship between a beam spot and light receiving areas of a detector.

The light collecting prism 62 has a shape of a plano-convex lens having substantially the same power as the relay lens 29 has. Further, the light collecting prism 62 also functions as a beam splitting prism. That is, a half-mirror surface 62A is formed inside the light collecting prism 62. The half-mirror surface 62A is inclined at 45 degrees with respect to the optical axis of the relay lens system. As shown in FIGS. 14 and 15, the beam reflected by the galvano mirror 26 is incident on the half-mirror surface 62A at the incident angle of 45 degrees. The beam reflected by the galvano mirror 26 is incident on the half-mirror surface 62A, and divided into a first beam which passes through the half-mirror surface 62A, and a second beam which is reflected by the half-mirror surface 61 A. The first beam passes through a lens surface 62B of the light collecting prism, is reflected by the reflection mirror 31 and incident on the objective lens 10.

The second beam is incident on the detector 52. The detector 52 has at least two light receiving areas 52A and 52B arranged in a direction in which the spot SP moves as the galvano mirror 26 rotates. As shown in FIG. 15 and similarly to the first and second embodiments, output signals of the light receiving areas 52A and 52B are applied to the differential amplifier 80, and the output of the differential amplifier 80 is input into the CPU 90 via the AID converter 91. The CPU 90 calculates the rotation angle of the galvano mirror 26 in accordance with the difference between the output signals of the light receiving areas 52A and 52B.

The position of the detector 52 and the light receiving areas 52A and 52B are determined such that each of the light receiving areas 52A and 52B receives the same amount of light when the galvano mirror 26 is located at the neutral position. Thus, by detecting the difference of light amounts received by the light receiving areas 52A and 52B, the amount of rotation (i.e., the rotation angle) by which the galvano mirror 26 rotates can be detected. FIGS. 14 and 15 show a situation when the galvano mirror 26 is located at the neutral position.

Figure 16:
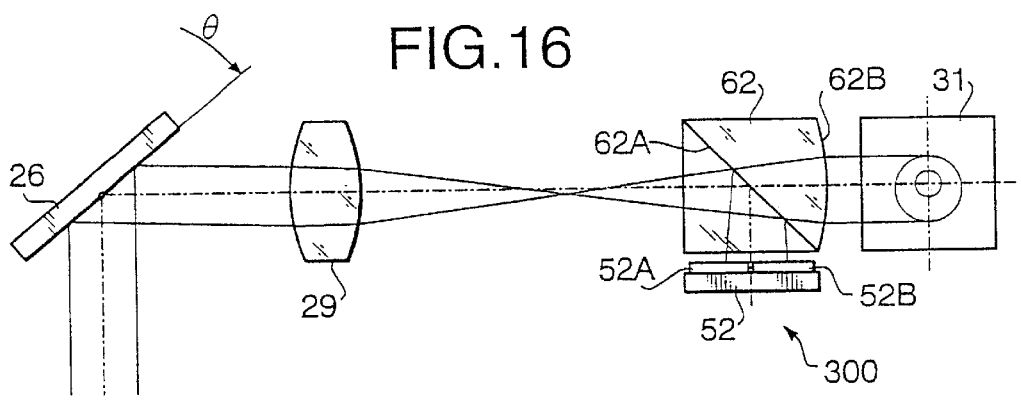
FIG. 16 shows how the beam proceeds when the galvano mirror is rotated.
Figure 17:
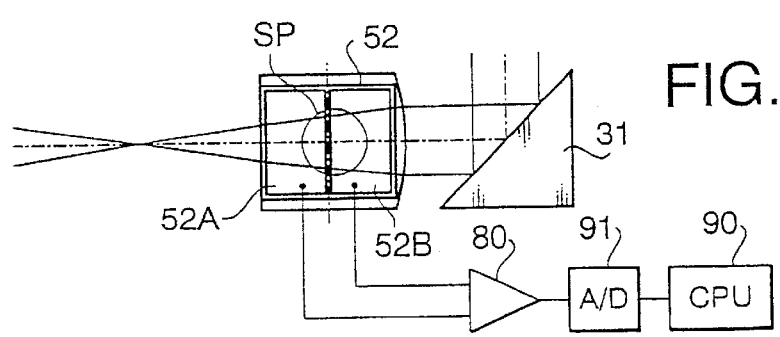
FIG. 17 shows a positional relationship between the beam spot and the light receiving areas when the galvano mirror is rotated.

FIGS. 16 and 17 show a situation where the galvano mirror 26 is rotated by a certain amount. When the galvano mirror 26 is rotated, the beam spot SP on the light receiving areas 52A and 52B also moves as shown in FIG. 17. Therefore, the light receiving areas 52A and 52B receive different amounts of light. By comparing the amounts of light respectively received by the light receiving areas 52A and 52B, the amount of rotation of the galvano mirror 26 is detected.

As described above, according to the third embodiment, the rotation amount of the galvano mirror 26 can be detected accurately, and therefore an accurate fine tracking operation can be performed.

The present disclosure relates to subject matters contained in Japanese Patent Applications Nos. HEI 09-309863, filed on Oct. 24, 1997, HEI 09-311522, filed on Oct. 27, 1997, HEI 09-311523, Oct. 27, 1997, which are expressly incorporated herein by reference in their entireties.

What is claimed is:

1. A head of an optical data recording/reproducing device, comprising:

a laser source that emits a laser beam;

a deflector on which said laser beam emitted by said laser source is incident;

a relay optical system that includes a relay lens group and an imaging lens group;

an objective lens system, said laser beam emitted by said laser source being incident on said objective lens system through said deflector and said relay optical system, a vicinity of a deflecting plane of said deflector and a principal plane position of said objective lens system having a substantially conjugate relationship;

a beam splitter provided between said relay lens group and said imaging lens group, said beam splitter dividing said laser beam passed through said relay lens group into a first beam and a second beam;

an optical detector that detects said second beam; and a controller that determines a direction and amount of rotation of said deflecting plane of said deflector in accordance with said second beam detected by said optical detector.

2. A head of an optical data recording/reproducing device, comprising:

a laser source that emits a laser beam;

a deflector on which said laser beam emitted by said laser source is incident;

a relay optical system that includes a relay lens group and an imaging lens group;

an objective lens system, said laser beam emitted by said laser source being incident on said objective lens system through said deflector and said relay optical system, a vicinity of a deflecting plane of said deflector and a principal plane position of said objective lens system having a substantially conjugate relationship;

a beam splitter provided substantially at a focal point of said laser beam between said relay lens group and said imaging lens group, said beam splitter dividing said laser beam passed through said relay lens group into a first beam and a second beam;

a one-dimensional optical position detector that detects said second beam; and a controller that determines a direction and amount of rotation of said deflecting plane of said deflector in accordance with said second beam received by said optical position detector.

* * * * *